(12) United States Patent
Hughes (10) Patent No.: US 11,958,154 B2
(45) Date of Patent: Apr. 16, 2024

(54) ADJUSTABLE HARDWARE JIG

(71) Applicant: Jackie Hughes, Danielsville, GA (US)

(72) Inventor: Jackie Hughes, Danielsville, GA (US)

( * ) Notice: Subject to any disclaimer, the term of this patent is extended or adjusted under 35 U.S.C. 154(b) by 0 days.

(21) Appl. No.: 18/207,647

(22) Filed: Jun. 8, 2023

(65) Prior Publication Data

US 2023/0405747 A1 Dec. 21, 2023

Related U.S. Application Data (60) Provisional application No. 63/352,734, filed on Jun. 16, 2022.

(51) Int. Cl.
| | |
|---|---|
| *B23Q 3/18* | (2006.01) |
| *B23B 47/28* | (2006.01) |
| *B25B 11/00* | (2006.01) |
| *B25H 7/02* | (2006.01) |

(52) U.S. Cl.
CPC .............. *B23Q 3/183* (2013.01); *B23B 47/28* (2013.01); *B23Q 3/186* (2013.01); *B25B 11/00* (2013.01); *B25H 7/02* (2013.01)

(58) Field of Classification Search
CPC ... B23B 2247/12; B23B 47/28; B23B 47/287; B23B 47/288; B23Q 1/56; B23Q 1/58; B23Q 1/585; B23Q 3/183; B23Q 3/186; B25H 7/02; B25H 7/04
See application file for complete search history.

(56) References Cited

U.S. PATENT DOCUMENTS

| | | | | |
|---|---|---|---|---|
| 2,842,860 | A * | 7/1958 | Gray | B25H 7/02 101/112 |
| 4,684,299 | A * | 8/1987 | Laliberte | B23B 47/287 408/72 R |
| 4,981,400 | A * | 1/1991 | Stover | B23B 47/287 33/667 |
| 5,743,684 | A * | 4/1998 | Rex | B23B 47/287 408/97 |
| 6,796,014 | B2 * | 9/2004 | Sarh | B25B 5/006 29/283 |
| 8,100,611 | B2 * | 1/2012 | Buttrick, Jr | B23B 47/28 408/1 R |
| 2007/0101598 | A1 * | 5/2007 | Miro | B23B 47/287 33/667 |
| 2011/0064531 | A1 * | 3/2011 | Osborne | B23B 49/023 408/103 |
| 2018/0345386 | A1 * | 12/2018 | Garcia | B25H 7/00 |

* cited by examiner

*Primary Examiner* — Tyrone V Hall, Jr.
(74) *Attorney, Agent, or Firm* — Smith Tempel Blaha LLC; Gregory Scott Smith (57) ABSTRACT

A motorized hardware jig that allows for the changing and setting of drill guides in a matter of seconds without the need for any tools. The motorized jig receives a height for the panel on the face of a drawer and a center-to-center measurement for the hardware. The motorized jig automatically moves the drill guides to the desired position for drilling holes for the hardware.

7 Claims, 14 Drawing Sheets

ADJUSTABLE HARDWARE JIG

BACKGROUND

The cabinet industry has taken great advantages of emerging technology through the years. For instance, CNC machines have been developed that automate the process of cutting cabinet boxes, doors, drawer boxes, molding, etc. Paints have been developed specifically to give cabinets a rich yet durable finish. Hardware has been developed to provide maximum movement of drawers, as well as adjustable doors and soft closing of drawers and doors. However, one area has not experienced much advancement in the use of technology and that would be the process of decorative hardware hole placement. Many cabinet makers spend up to or well over $1,000,000 for tools to build and finish cabinets and then rely on rudimentary $40-$300 tools or jigs for drilling the holes for receiving the hardware. These rudimentary jigs have very limited lifespans and then become useless as the result of constant tightening and loosening of the screws necessary to hold a pointer in position. At best, it is very time consuming to use these rudimentary jigs and the process of using them is very prone to errors. As a result, the process of installing the hardware is very time consuming, may result in having to make additional doors or drawer fronts, and eats into the cabinet makers profits.

Thus, there is a need in the art for an improved jig that is reliable, has a long-lifespan, is accurate and saves the cabinet maker time during the hardware installation process.

BRIEF SUMMARY

An embodiment of the present invention is focused on an apparatus that automates the placement of one or more drill guides for drilling holes for cabinet and/or drawer hardware. The apparatus includes a top subassembly that includes a shelf for resting the apparatus on a particular edge of a panel to be drilled. Further, a plurality of extension arms are used for centering the apparatus on a front face of the panel.

The plurality of extension arms includes a first extension arm and a second extension arm. The first extension arm includes a first end cap and a plurality of teeth along a first surface of the first extension arm. The second extension arm includes a second end cap and a plurality of teeth along a first surface of the second extension arm. The top subassembly defines a channel for housing the first extension arm and the second extension arm such that the first surface of the first extension arm is held such that it is facing the first surface of the second extension arm. Further, a spacer is positioned between the first extension arm and the second extension arm.

Even further, one or more synchronizing gears engaged are placed between the first extension arm and the second extension arm. The synchronizing gears align and are engaged with the teeth on the first surface of the first extension arm and the first surface of the second extension arm. As such, if the first extension arm or the second extension arm is extended, the synchronizing gears cause the other extension arm to extend the same amount.

Exemplary embodiments include a horizontal subassembly that is configured to be adjusted vertically up and down and including one or more drill guides.

The exemplary embodiments may include a processing unit that is configured to receive measurement parameters from an interface and to control the adjustment of the horizontal subassembly in accordance with the measurement parameters. Thus, the horizontal subassembly can be adjusted to align the drill guides at a desired location along the height of the face of the panel.

In some embodiments, the horizontal subassembly includes two adjustable drill guides that can be adjusted horizontally along the horizontal subassembly. In some embodiments, the horizontal subassembly includes a first motor and a drive gear that is rotated either clockwise or counterclockwise by the first motor. Further, the drive gear interfaces to a threaded rod for each adjustable drill guide. The thread rods include a rod gear that is driven by the drive gear. Thus, when the drive gear rotates, the threaded rods also rotate. The drill guides include a threaded aperture or receptor such that the drill guides are threaded onto the respective threaded rod. When the threaded rod rotates under the control of the first motor, the drill guides move a first direction horizontally when the threaded rods rotate clockwise and in a second direction horizontally when the threaded rods rotate counterclockwise.

Various embodiments may also include a subassembly that operates to perform the adjustment of the horizontal subassembly. This subassembly includes a second motor mechanical drive that is driven by the second motor, the mechanical drive system including one or more threaded vertical rods that are rotated under the control of the second motor and that are threaded into a threaded receiver of the horizontal subassembly, whereby when the one or more threaded vertical rods rotate in a first direction, the horizontal subassembly is lowered, and when the one or more threaded vertical rods rotate in a second direction, the horizontal subassembly is raised.

In some of the embodiments, the first end cap and the second end cap on the extension arms can be placed on opposing sides of the panel face to hold the apparatus in position. Further, in some embodiments, the synchronization of the first extension arm and the second extension arm causes the apparatus to be centered on the panel face relevant to the direction of the extension arms.

These and other embodiments, features, and aspects of the adjustable hardware jig are further described in the detailed description in describing the drawings.

DETAILED DESCRIPTION OF VARIOUS EMBODIMENTS

The present invention, as well as features and aspects thereof, is directed towards an adjustable hardware jig, and more specifically, to a hardware jig that receives input measurement parameters and then automatically adjust itself to locate hole guides for drilling holes in a panel, such as the front or face panel for a cabinet drawer, for receiving the hardware.

More specifically, in an exemplary embodiment of the adjustable hardware jig, an interface is provided for receiving measurement parameters related to the face panel and the hardware. Once the measurement data is received into the adjustable hardware jig, the adjustable hardware jig operates to move one or more hole guides into the correct position relative to the face panel wherein the hardware is to be installed. The hole guides are then ready to guide a drill bit into the correct location of the face panel. In one embodiment, the measurement parameters include the height of the face panel and the center-to-center dimension of the hardware (for two-hole installations).

Further, embodiments of the adjustable hardware jig may include built-in self-centering adjustment guides to automatically place the jig in the center position of the face panel, or a desired position of the face panel. For example, if drawer faces are being drilled, the adjustable hardware jig can be set up for the first drawer face, and once set up it can be moved to any number of additional drawer faces of the same size for immediate drilling. If a different size drawer is to be drilled, then the process of receiving measurement parameters is repeated to adjust for the new drawer size.

In some embodiments, the adjustable hardware jig is implemented using stepper motors driven by battery power; however other types of mechanisms can be used and other power sources may be utilized.

Further embodiments, features, aspects, operations, advantages and elements of the adjustable hardware jig are described further herein below in conjunction with the various drawings in which like labels represent like elements throughout the several views.

Figure 1:
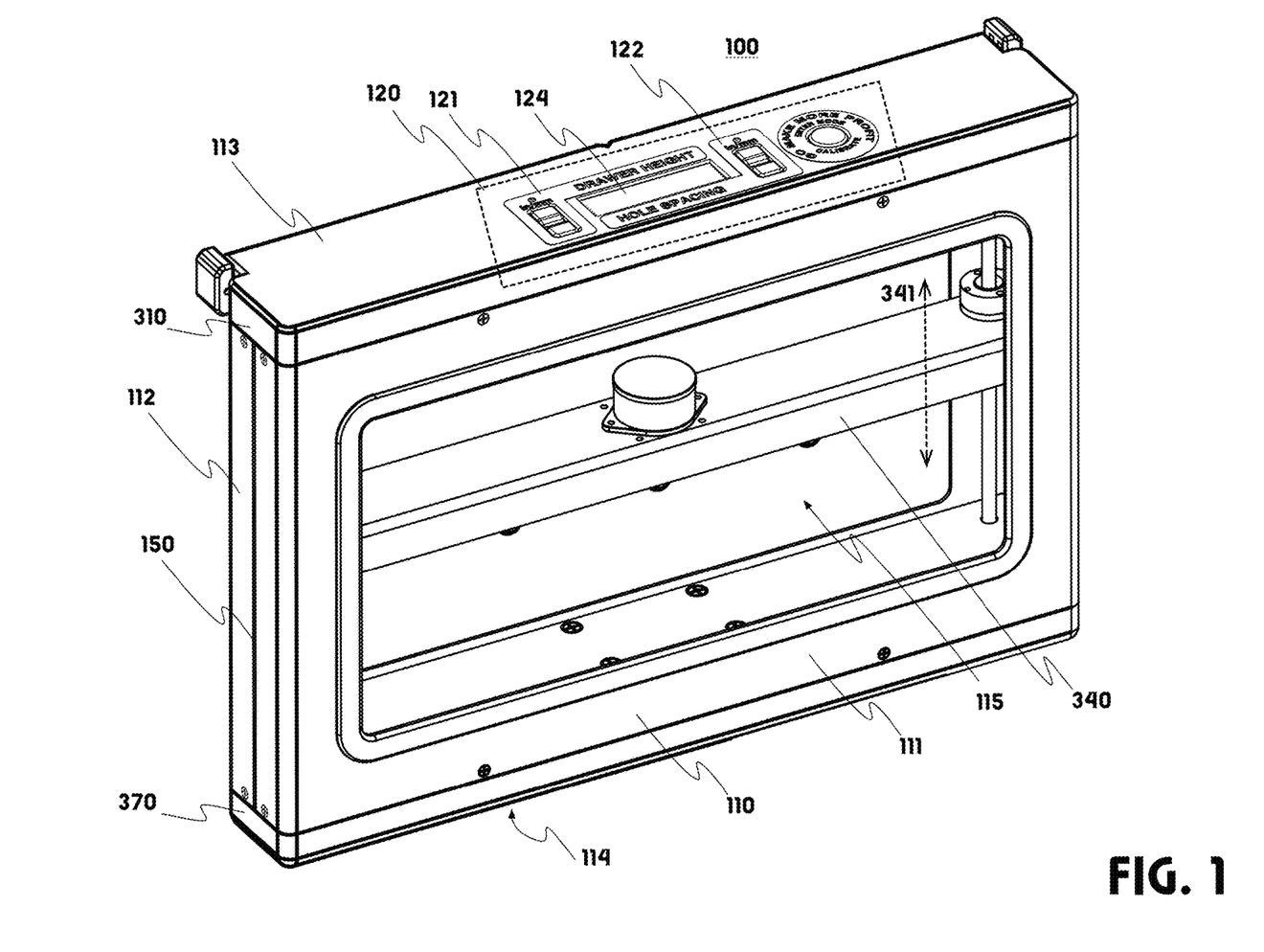
FIG. 1 is a front perspective view of an exemplary embodiment of an adjustable hardware jig.

FIG. 1 is a front perspective view of an exemplary embodiment of an adjustable hardware jig. The adjustable hardware jig 100 is illustrated as including a casing 110. The casing 110 is illustrated as including a front 111, back 112, top 113 and bottom 114. In the illustrated embodiment the front 111 and the back 112 wrap around the sides and join together along seam 150 (as shown on left side with a similar structure on the right side). The front 111 and the back 112 include a window or opening 115 allowing access through the casing 110.

The top 113 is illustrated as including a user interface 120 that includes a toggle switch 121 for entering a drawer face height and a toggle switch 122 for entering a hole spacing as non-limiting examples. In the illustrated example, the toggle switch 121 can be used to increase or decrease the measurement of the face panel height which is displayed on display 124.

Figure 2:
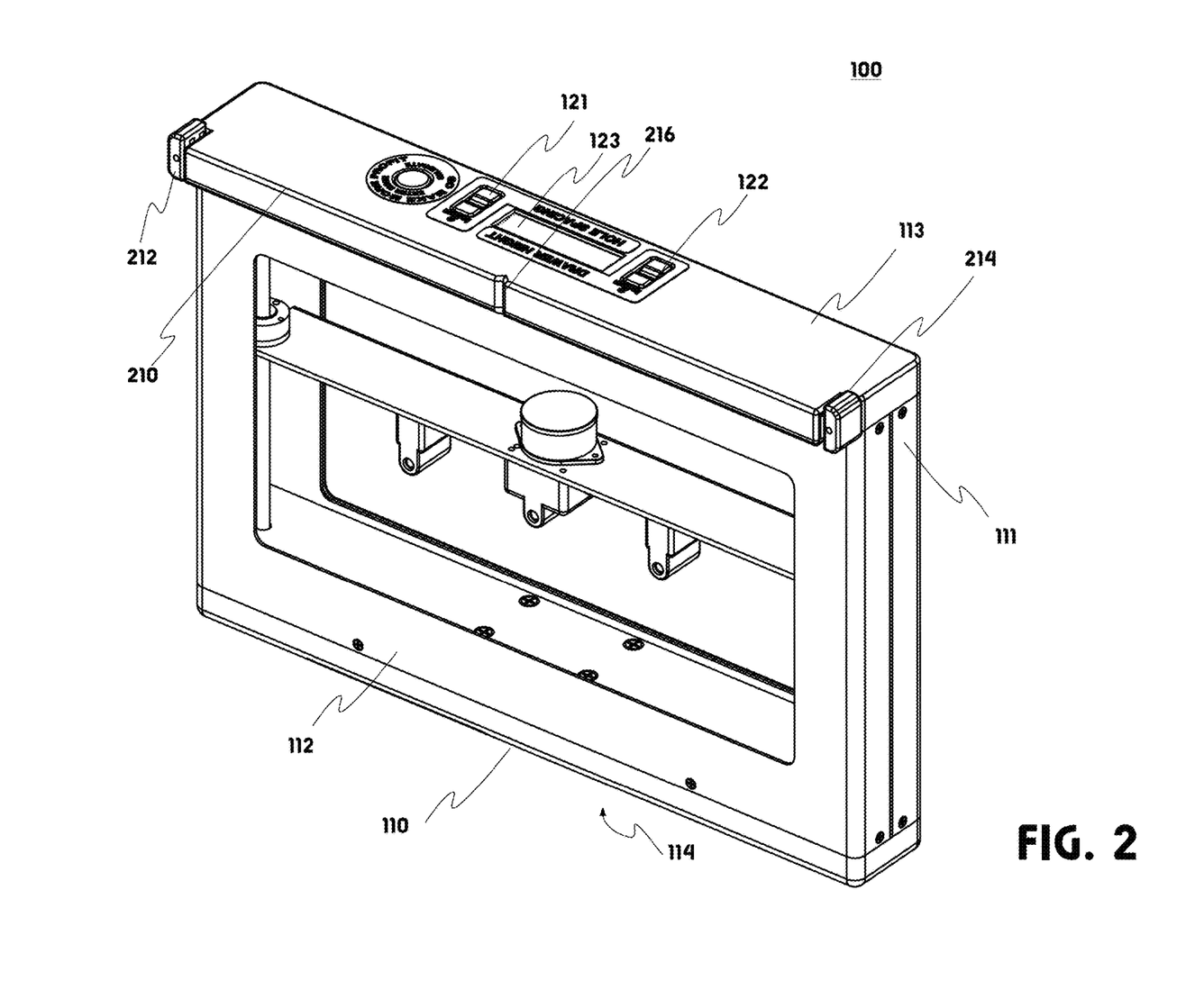
FIG. 2 is a rear perspective view of the exemplary embodiment illustrated in FIG. 1.

FIG. 2 is a rear perspective view of the exemplary embodiment illustrated in FIG. 1. As best seen in FIG. 2, the top 113 of the casing 110 includes a shelf 210 that extends past the plane of the back 112. In operation, the shelf 210 can rest on the top surface of a face panel. The top 113 also includes left and right extension arms 212 and 214 respectively that are synchronized with each other such that as one of the arms are extended, the other arm extends the same amount. The left and right extension arms are used to center the adjustable hardware jig 100 on the face panel. Thus, extending the left and right extension arms 212 and 214 so that the ends of the extension arms 212 and 214 can be positioned against the sides of the face panel results in the notch 216 in the back-side of the top 113 to be in the center of the face panel.

Figure 3:
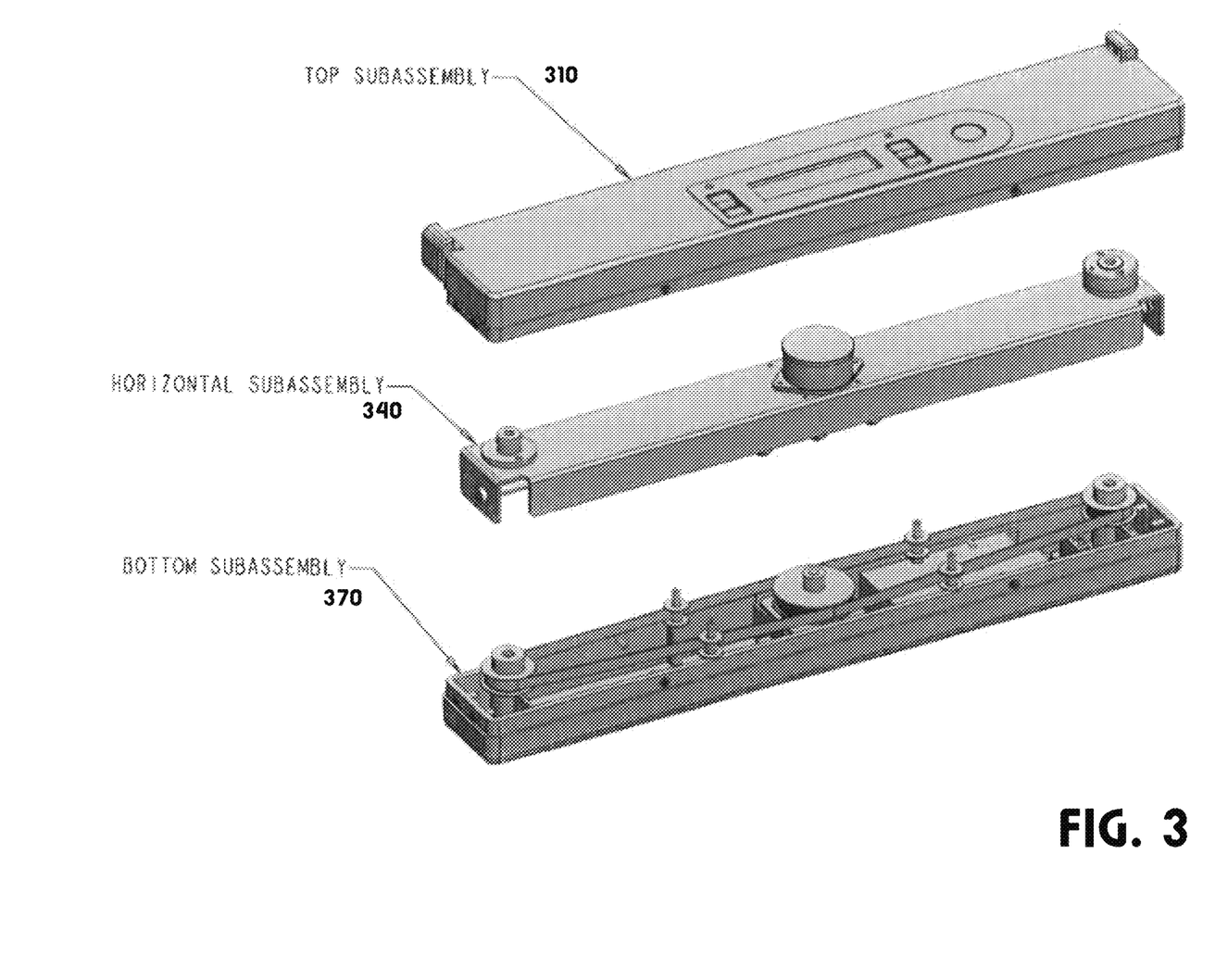
FIG. 3 is a perspective diagram of three subassemblies of the exemplary adjustable hardware jig illustrated in FIG. 1.

FIG. 3 is a perspective diagram of three subassemblies of the exemplary adjustable hardware jig illustrated in FIG. 1. The three subassemblies illustrated are a top subassembly 310, a horizontal subassembly 340 and a bottom subassembly 370. The horizontal subassembly 340 is the component, as illustrated in FIG. 1, that moves up and down between the top subassembly 310 and the bottom assembly 370.

Figure 4:
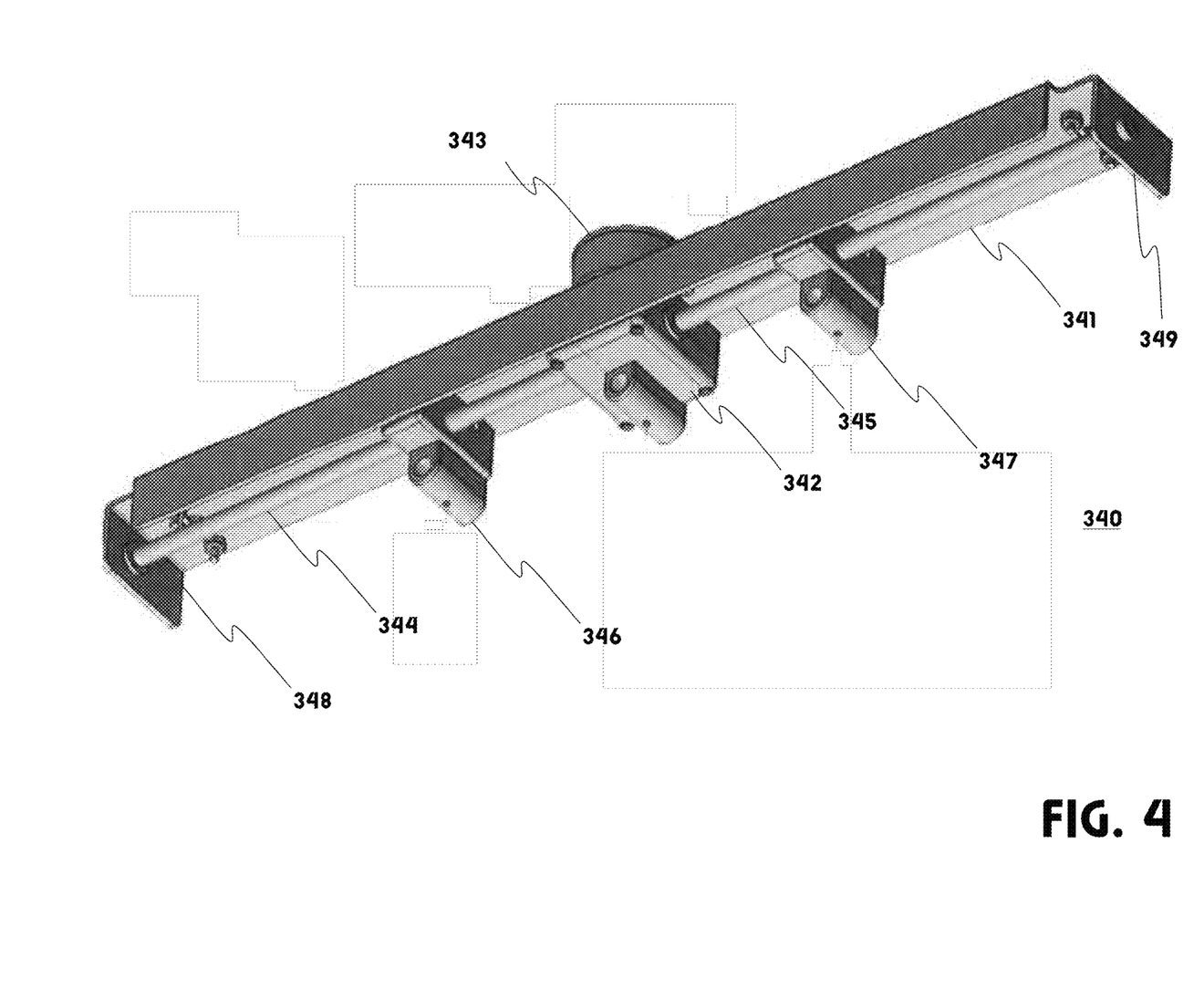
FIG. 4 is a more detailed perspective view of the lower side of the horizontal subassembly illustrated in FIG. 3.
Figure 5:
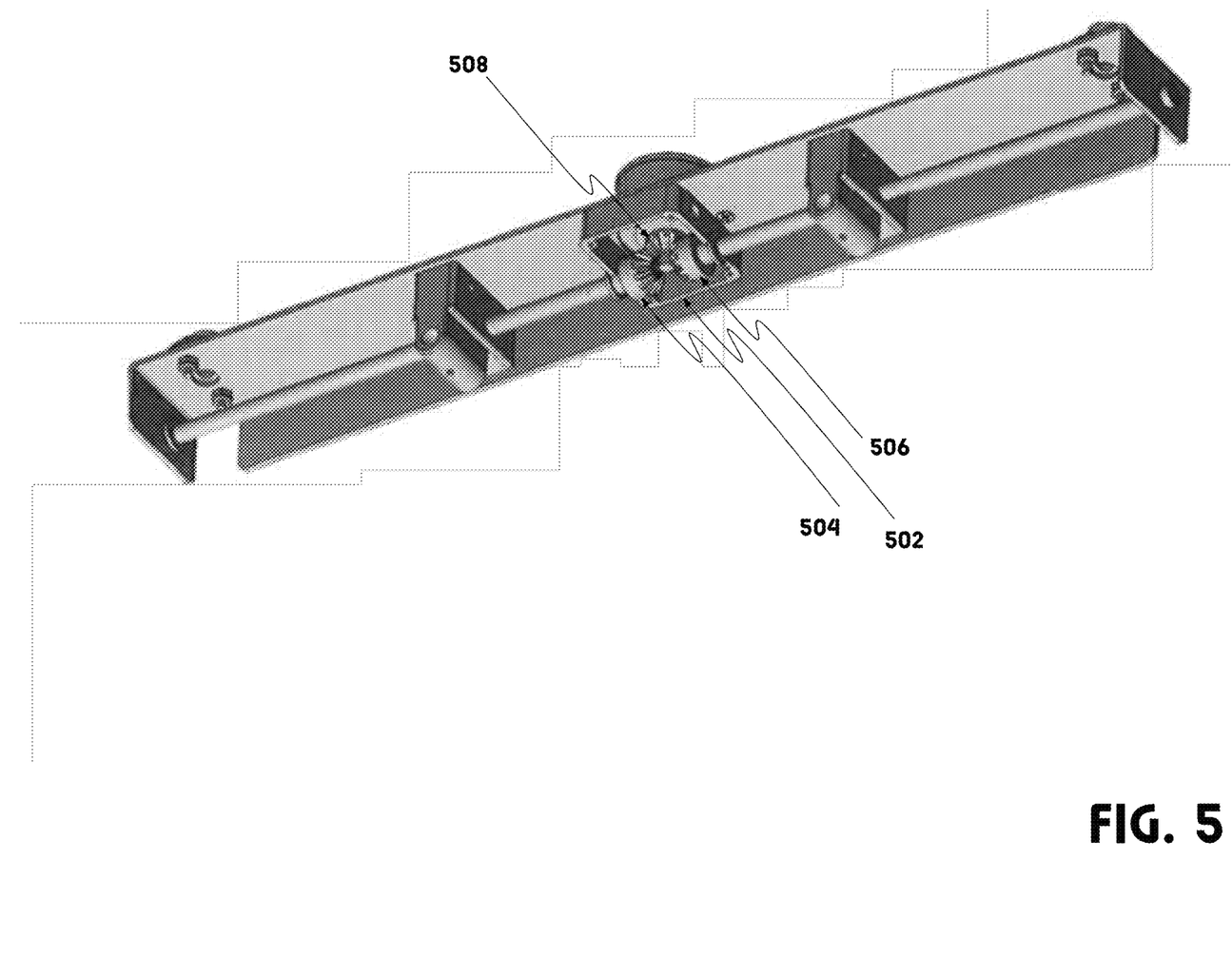
FIG. 5 is drawing illustrating the drive gears for the horizontal subassembly.

FIG. 4 is a more detailed perspective view of the lower side of the horizontal subassembly illustrated in FIG. 3. The purpose of the horizontal subassembly 340 is to house one or more drilling guides for drilling of one or more holes in the face panel for receiving of the hardware. The horizontal subassembly 340 includes electro-mechanical elements to move two drill guides along a horizontal plane such that the drilling guides are centered on the face panel and are separated by the distance between the centers of the hardware mounts. The horizontal subassembly 340 includes a horizontal frame 341 with a centered carriage housing 342. A stepper motor or other similar motor or actuation device 343 is mounted on the top side of the horizontal frame 341 and is used to drive a gear subsystem 502 (best seen in FIG. 5) residing within the carriage housing 342. FIG. 5 is drawing illustrating the drive gears for the horizontal subassembly. A first drive rod 344 extends from the carriage housing 342 to a first side flange 348 of the horizontal frame 341. In the illustrated embodiment, the first drive rod 344 extends through an aperture in the first side flange 348, which may include a bushing to allow for rotation of the first drive rod 344. The first drive rod 344 includes a gear 504 (see FIG. 5) on the end the enters the carriage housing 342. Similarly, a second drive rod 345 extends through an aperture in a second side flange 349 of the horizontal frame 341, which may include a bushing to allow for rotation of the first drive rod 345. The second drive rod 345 includes a gear 506 (see FIG. 5) on the end that enters the carriage housing 342. The gears 504 and 506 interface with gear 508 driven by the step motor 343.

The first drive rod 344 and the second drive rod 345 are threaded. A first drill guide 350 includes an internally threaded aperture that allows the first drill guide 346 to be threaded onto the first drive rod 344. Similarly, a second drill guide 347 includes an internally threaded aperture that allows the second drill guide 347 to be threaded onto the second drive rod 345. The first and second drill guides 346 and 347 thus include a base that includes the threaded aperture and then a drill guide. In operation, the step motor 343, when actuated, drives the gear 508 to rotate in a forward or reverse direction. When gear 508 is rotated, it then drives the gear 504 causing the first drive rod 344 to rotate and gear 506 causing the second drive rod 345 to rotate. Depending on the direction of rotation, the first drill guide 346 and the second drill guide 347 either move away from each other or towards each other as the threaded drive rods 344 and 345 respectively rotate. In the illustrated embodiment, a third drill guide 350 is fixed in the center of the horizontal assembly 340. The fixed third drill guide can be utilized for hardware that has a single connection point, such as a knob pull or hardware that may include three contact points.

Figure 6:
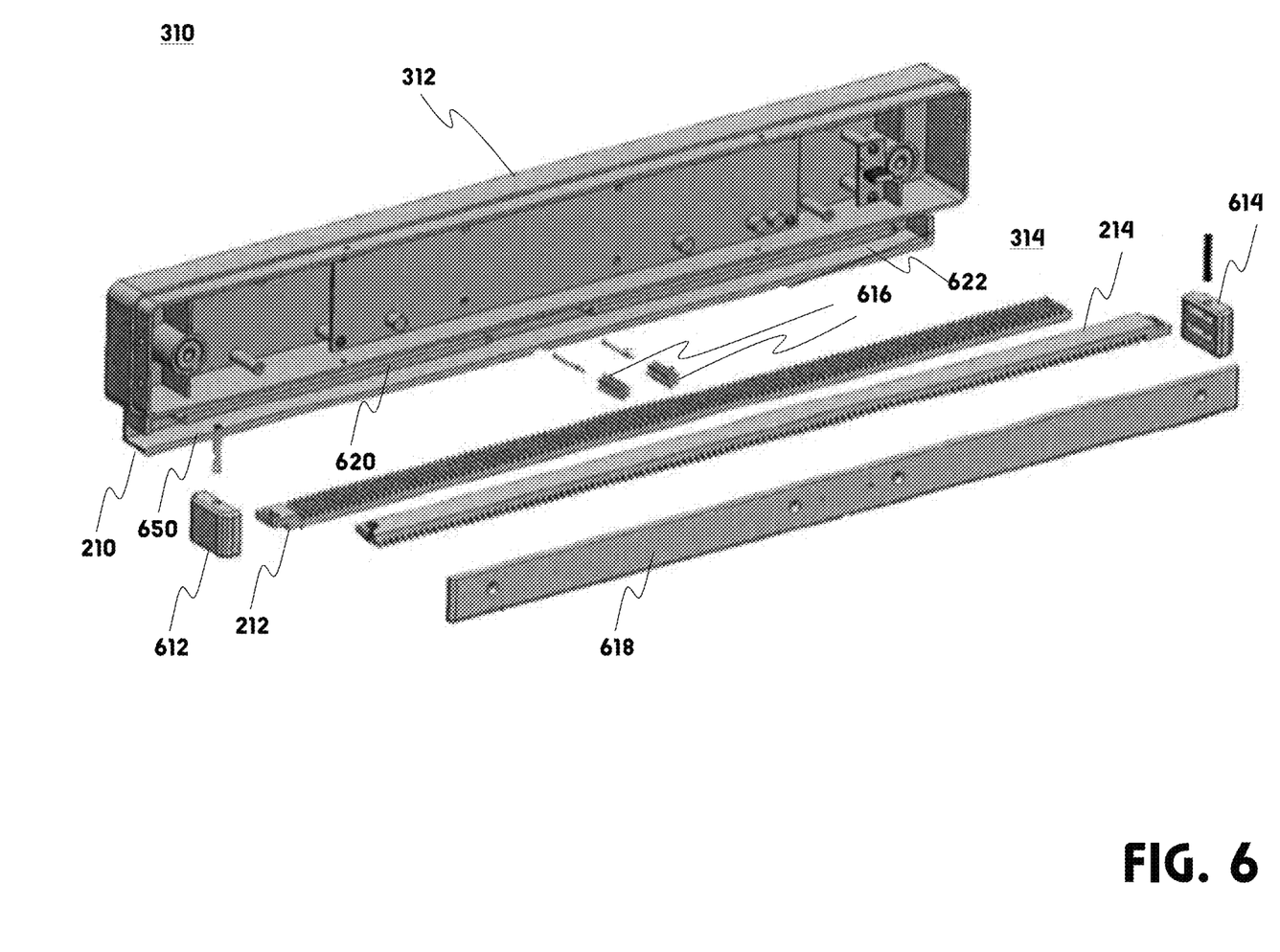
FIG. 6 is a more detailed perspective view of the top subassembly illustrated in FIG. 3.

FIG. 6 is a more detailed perspective view of the top subassembly illustrated in FIG. 3. The top subassembly 310 includes a frame 312 and an extension arm assembly 314. The extension arm assembly includes a first extension arm 212 and a second extension arm 214, a first cap 612 and a second extension arm cap 614, synchronizing gears 616 and an extension arm channel 650 defined by a portion of the frame 310 that defines the shelf 210 and cover plate 618. Spacers 620 and 622 reside within the extension arm channel 650 and operate to separate the first extension arm 212 and the second extension arm 214. The synchronizing gears 616 are installed between the spacer 620 and the spacer 622. The first extension arm 212 is inserted into the extension arm channel 650 on one side of the spacers 620 and 622 and one side of the synchronizing gears 616. The second extension arm 214 is inserted into the extension arm channel 650 on the opposing side of the spacers 620 and 622 and the synchronizing gears 616. Once installed, the teeth of the first extension arm 212 face the teeth of the second extension arm 214, and the teeth of both extension arms are engaged with the synchronizing gears 616 but the spacers 620 and 622 prevent the teeth of the extension arms from engaging with each other. The first cap 612 is attached to the end of the first extension arm 212 and the second cap 614 is attached to the end of the second extension arm 214.

Figure 7:
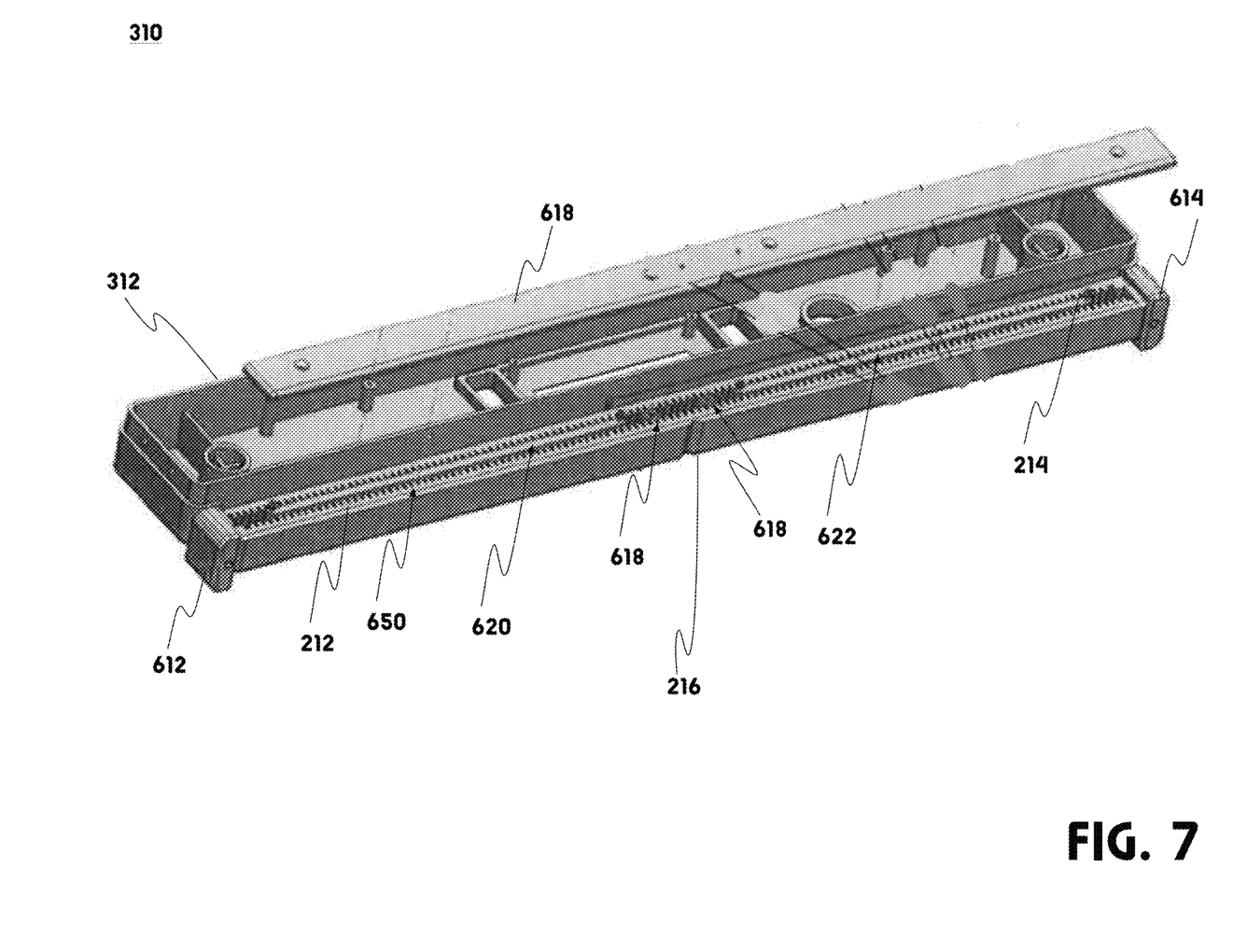
FIG. 7 illustrates an almost fully assembled view of the top subassembly illustrated in FIG. 3 and FIG. 6.

FIG. 7 illustrates an almost fully assembled view of the top subassembly illustrated in FIG. 3 and FIG. 6. The purpose of the top subassembly 310 is to provide centering extension arms that are used to hold the adjustable hardware jig 100 in a centered position on the face panel. The top subassembly 310 is shown with the first extension arm 212 and the second extension arm 214 placed within the extension arm channel 650, separated by the spacers 620 and 622 and the synchronizing gears 616. It should be appreciated that in this configuration, if one of the extension arms are extended from the top subassembly 310 (i.e., the first extension arm 212 as a non-limiting example), as the extension arm is extended, the teeth of the extension arm engage with the synchronizing gears 618 and force them to rotate. As the synchronizing gears 618 rotate, because they are also engaged with the teeth of the other extension arm (i.e., the second extension arm), that extension arm is also extended by the same amount. As such, it should be appreciated that if one or both of the extension arms are extended, the distance from each of the end caps 612 and 614 to the center 216 of the top subassembly 310 remains equal to each other.

It should be appreciated that in some embodiments only one synchronizing gear may be used or more than two synchronizing gears may be used. Further, in some embodiments one or more of the synchronizing gears may be controlled by a stepper motor and a processor. As such, the user interface may include the ability to receive the width of the face panel and then automatically cause the stepper motor to move the extension arms 212 and 214 the right amount for securing the adjustable hardware jig 100 for the face panel.

Figure 8:
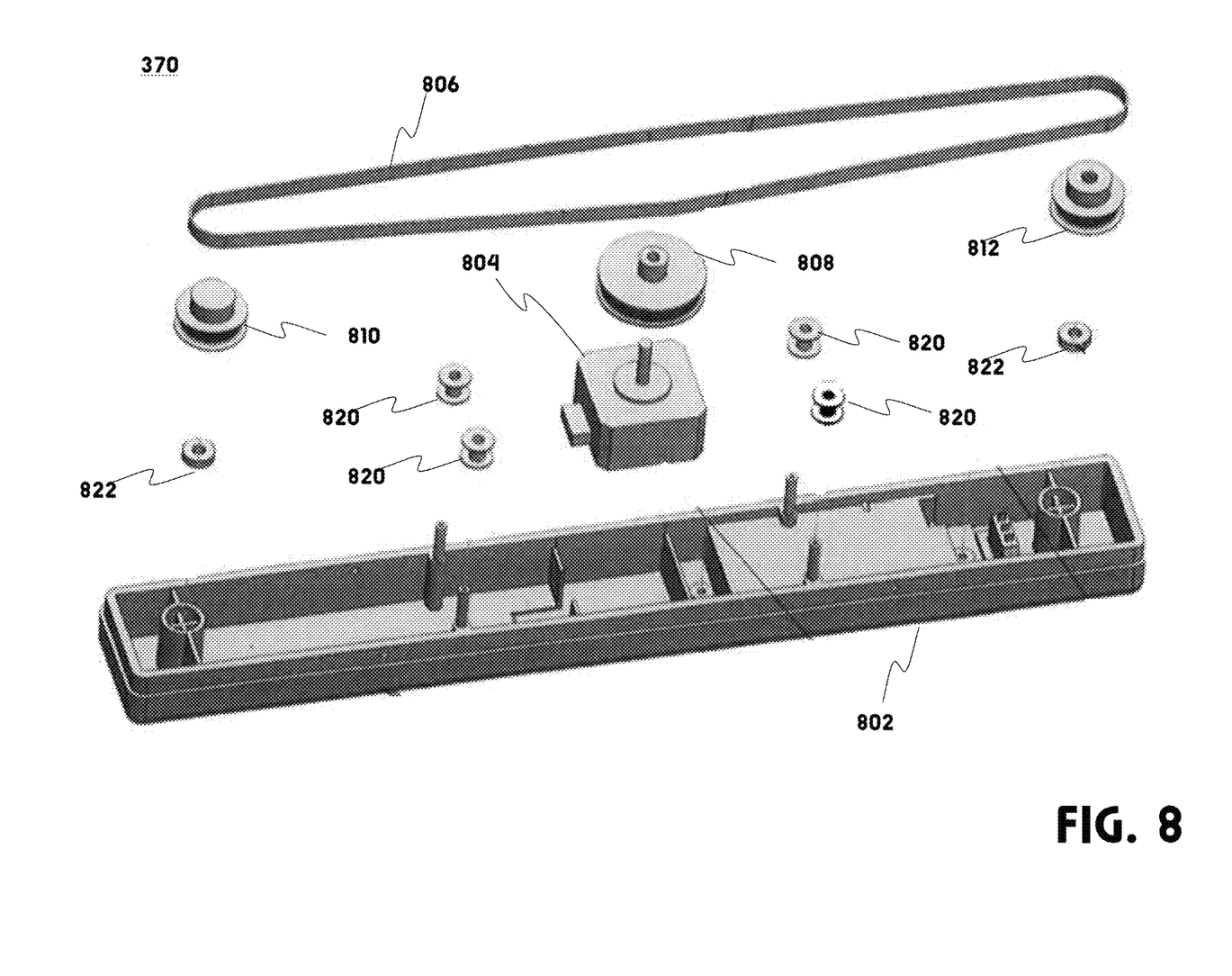
FIG. 8 is an exploded view of the lower subassembly 370.

FIG. 8 is an exploded view of the lower subassembly 370. The purpose of the lower subassembly 370 is to move the horizontal subassembly 340 vertically up and down to vertically center the horizontal subassembly 340 on a face panel. The lower subassembly 370 includes the lower subassembly frame 802 for housing the mechanical components for the lower subassembly 370. The mechanical components of the lower subassembly include a step motor 804, drive belt 806, drive wheel 808, first rod driver 810 and second rod driver 812, drive belt guides 820, and washers 822. The fully assembled lower subassembly 370 is shown in FIG. 3.

Figure 9:
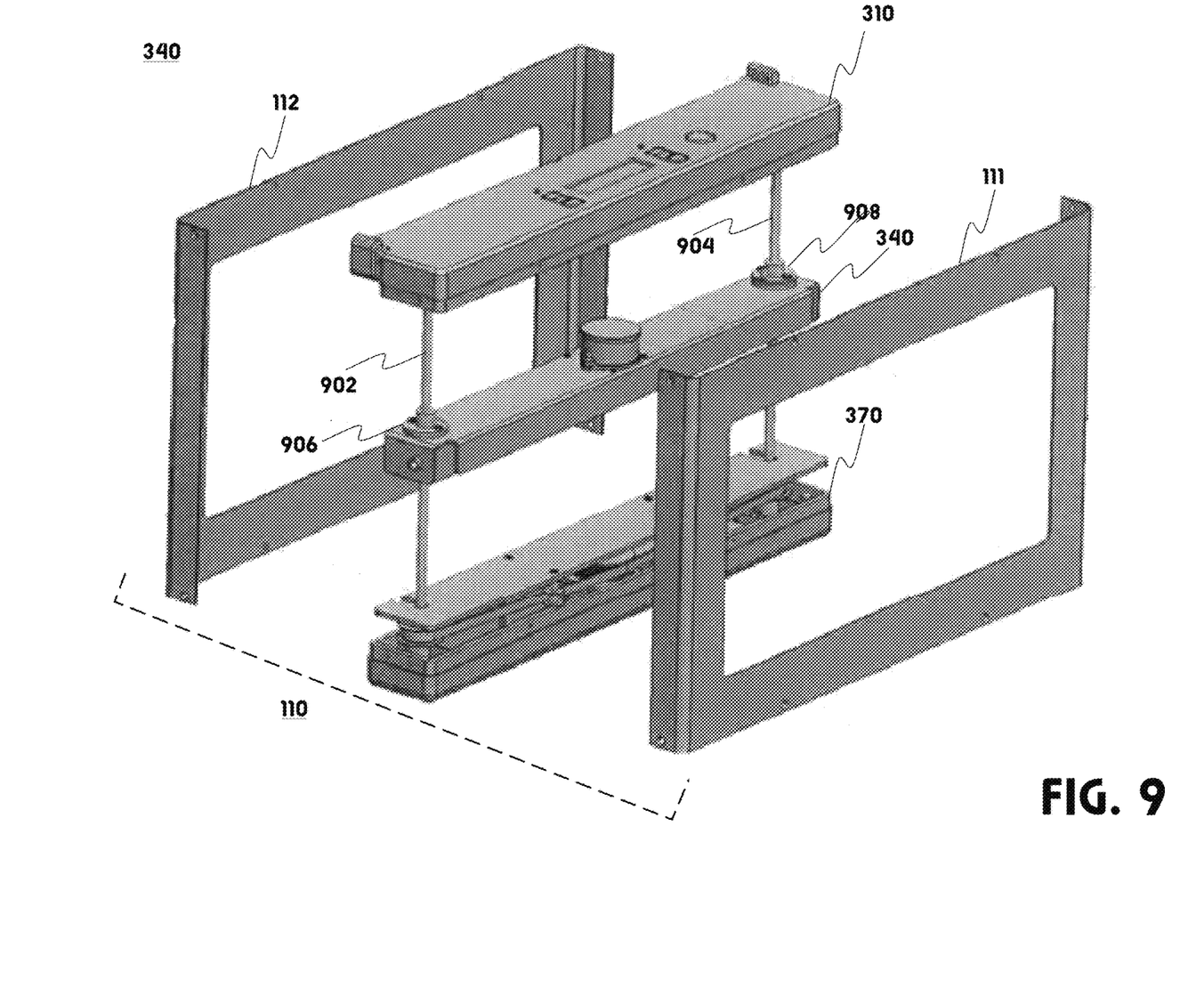
FIG. 9 illustrates an exploded view of the adjustable hardware jig 100 with the top subassembly 310, horizontal subassembly 340 and bottom subassembly 370 all assembled together between the front 111 and back 112 of the casing 110.

FIG. 9 illustrates an exploded view of the adjustable hardware jig 100 with the top subassembly 310, horizontal subassembly 340 and bottom subassembly 370 all assembled together between the front 111 and back 112 of the casing 110. In the illustrated embodiment, rods 902 and 904 are in place with the upper end of rods 902 and 904 being rotatably attached to the top subassembly 310 and the lower ends of rods 902 and 904 being fixedly attached respectively to the first rod driver 810 and the second rod driver 812 of the lower subassembly 370. When the step motor 804 is in operation to turn the drive wheel 808 either clockwise or counterclockwise, drive belt 806 is driven by the drive wheel 808 which results in rotating the first rod driver 810 and the second rod driver 812. The rotation of the first rod driver 810 and the second rod diver 812 causes rods 902 and 904 respectively to rotate. Rods 902 and 904 are threaded and are fed through threaded connectors 906 and 908 in the horizontal subassembly 340. Thus, it will be appreciated that as the rods 902 and 904 are rotated in a first direction, the horizontal subassembly 340 moves vertically upwards. When the rods 902 and 904 are rotated in a second direction, the horizontal subassembly 340 moves vertically downwards.

Figure 10:
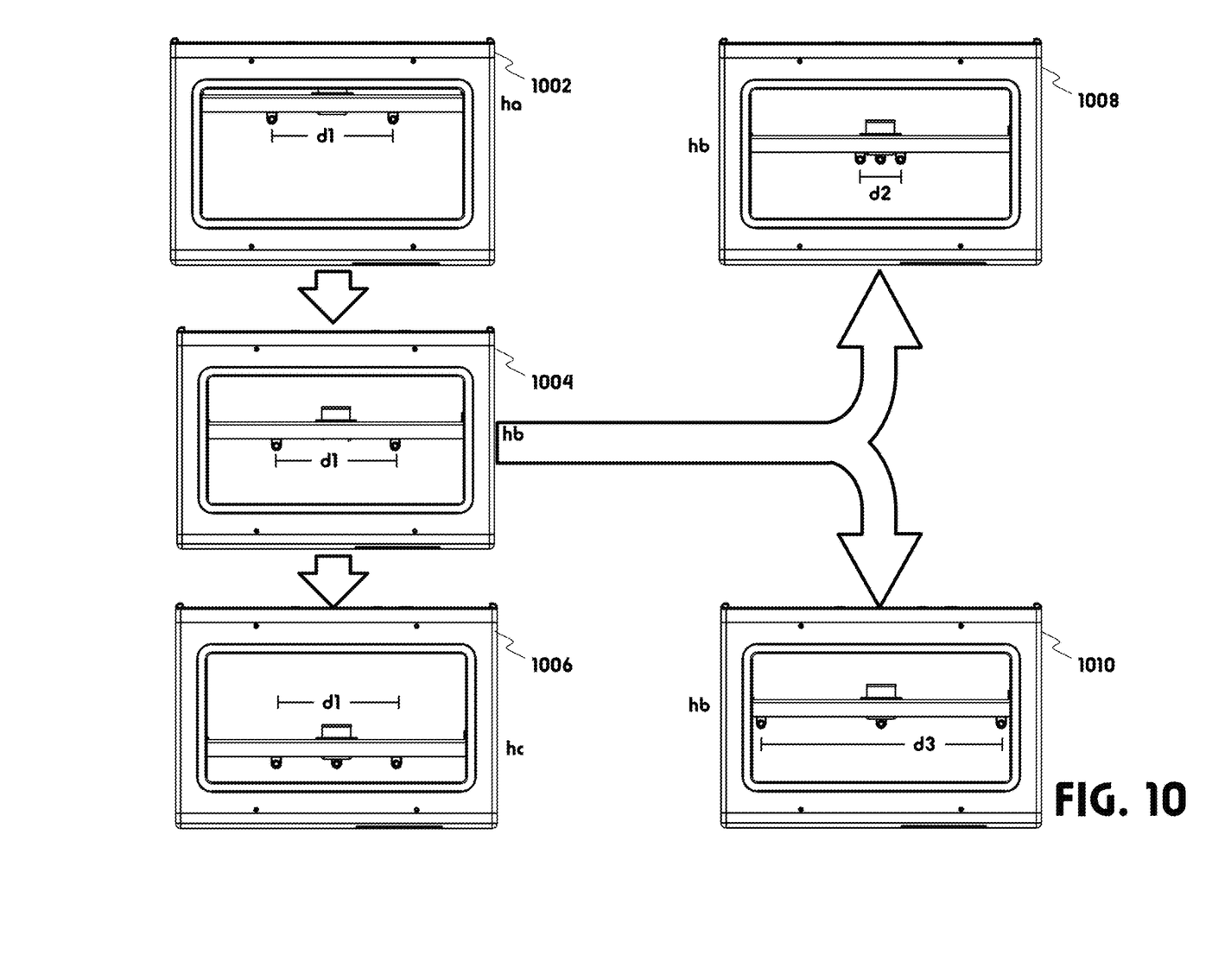
FIG. 10 is a flow diagram illustrating exemplary state transitions for the movement of the drill guides and the horizontal subassembly in an exemplary embodiment of the adjustable hardware jig.

FIG. 10 is a flow diagram illustrating exemplary state transitions for the movement of the drill guides and the horizontal subassembly in an exemplary embodiment of the adjustable hardware jig. Starting at state 1002, the horizontal subassembly 340 is positioned in a raised position for a face panel height of ha with the drill guides being set at a distance of d1 for hardware with a center-to-center measurement of d1. If the adjustable hardware jig 100 is then moved to a face panel with height hb, then the adjustable hardware jig 100 can be adjusted in accordance with state 1004. Likewise, if the adjustable hardware jig 100 is moved to a panel face of height hc, then the adjustable hardware jig 100 can be adjusted in accordance with state 1006. Similarly, if the hardware has a center-to-center measurement of d2 and the panel height is hb, the adjustable hardware jig 100 can transition to the state 1008. Further, if the hardware has a center-to-center measurement of d3 and the panel height is hb, the adjustable hardware jig 100 can transition to the state 1010. It will be appreciated that the illustrated states are simply provided as an example and a wide range of face panel heights and center-to-center measurements can be utilized with the adjustable hardware jig 100.

Figure 11:
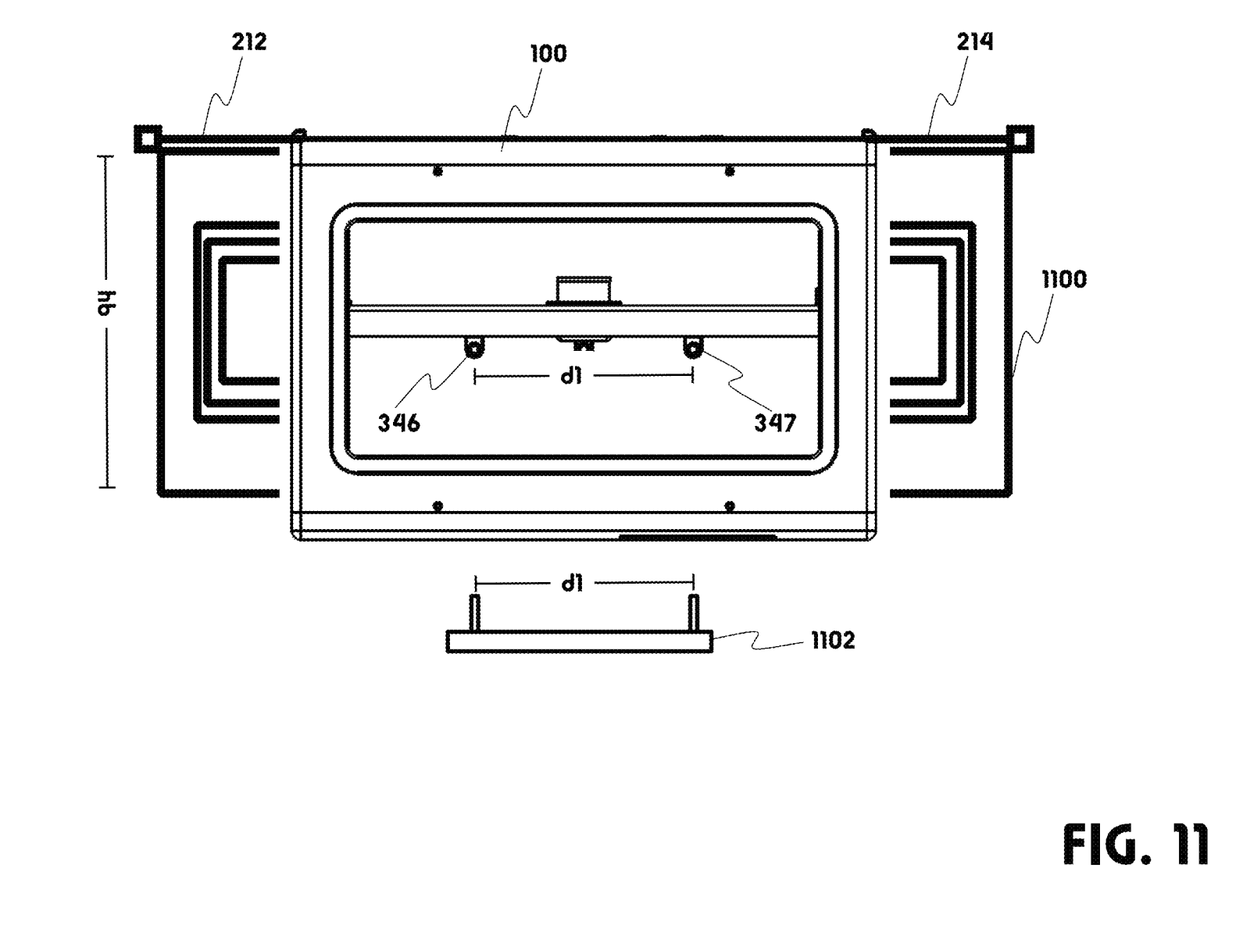
FIG. 11 is a conceptual diagram of an exemplary embodiment of an adjustable hardware jig being utilized on a panel face.

FIG. 11 is a conceptual diagram of an exemplary embodiment of an adjustable hardware jig being utilized on a face panel. The face panel 1100 is illustrated as having a height of hb. The first extension arm 212 and the second extension arm 214 are extended to secure the adjustable hardware jig 100 in the center of the face panel 1100. The drill guides 346 and 347 are shown as being adjusted to the center-to-center measurement of d1 in conformance with the hardware pull 1102.

Figure 12:
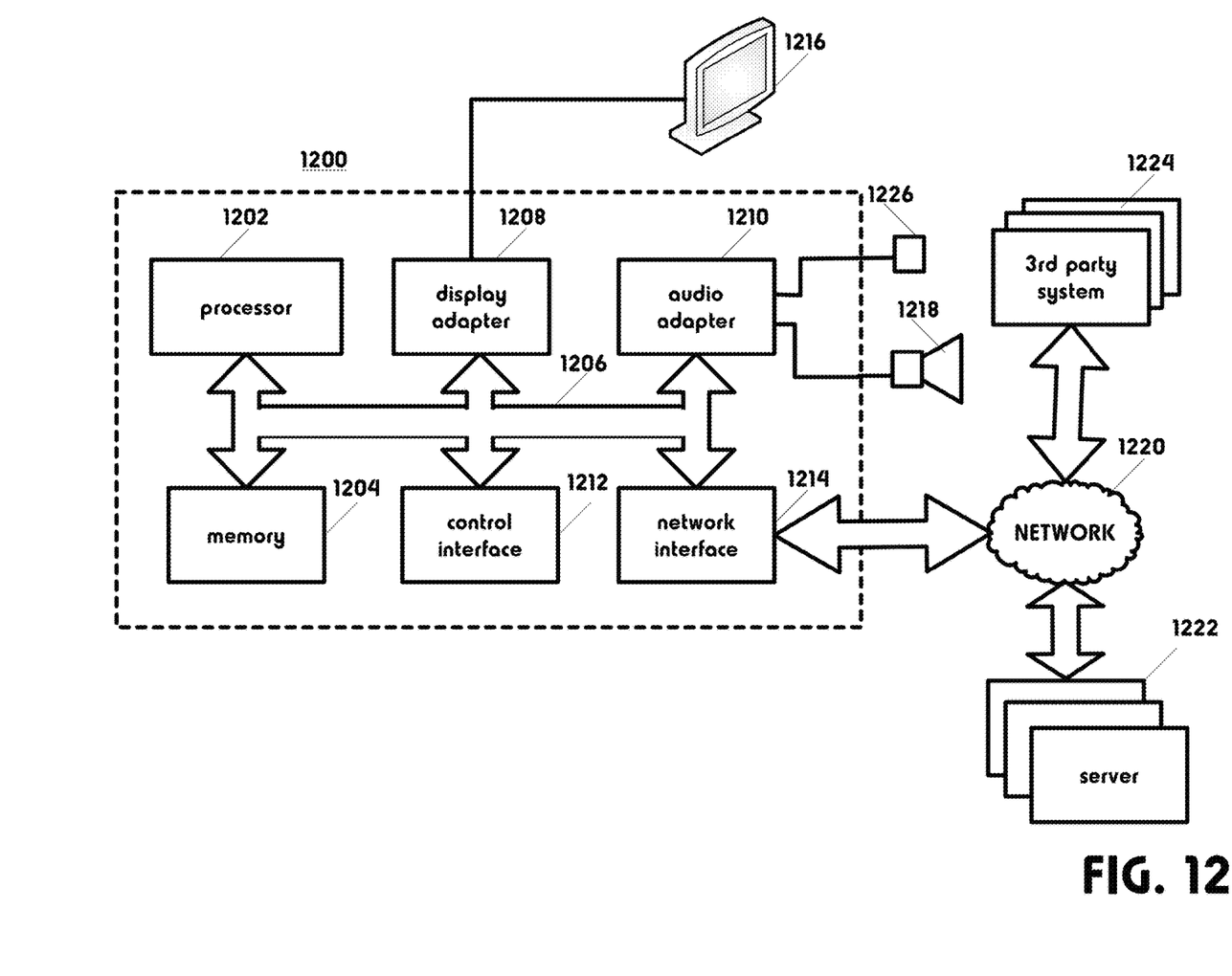
FIG. 12 is a functional block diagram of the components of an exemplary embodiment of system or sub-system operating as a controller or processor 1200 that could be used in various embodiments of the disclosure for controlling aspects of the various embodiments.

FIG. 12 is a functional block diagram of the components of an exemplary embodiment of system or sub-system operating as a controller or processor 1200 that could be used in various embodiments of the disclosure for controlling aspects of the various embodiments. It will be appreciated that not all of the components illustrated in FIG. 12 are required in all embodiments of the adjustable hardware jig but, each of the components are presented and described in conjunction with FIG. 12 to provide a complete and overall understanding of the components. The controller can include a general computing platform 1200 illustrated as including a processor/memory device 1202/1204 that may be integrated with each other or, communicatively connected over a bus or similar interface 1206. The processor 1202 can be a variety of processor types including microprocessors, micro-controllers, programmable arrays, custom IC's etc. and may also include single or multiple processors with or without accelerators or the like. The memory element of 1204 may include a variety of structures, including but not limited to RAM, ROM, magnetic media, optical media, bubble memory, FLASH memory, EPROM, EEPROM, etc. The processor 1202, or other components in the controller may also provide components such as a real-time clock, analog to digital convertors, digital to analog convertors, etc. The processor 1202 also interfaces to a variety of elements including a control interface 1212, a display adapter 1208, an audio adapter 1210, and network/device interface 1214. The control interface 1212 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 1208 can be used to drive a variety of alert elements 1216, such as display devices including an LED display, LCD display, one or more LEDs or other display devices. The audio adapter 1210 interfaces to and drives another alert element 1218, such as a speaker or speaker system, buzzer, bell, etc. The network/interface 1214 may interface to a network 1220 which may be any type of network including, but not limited to the Internet, a global network, a wide area network, a local area network, a wired network, a wireless network or any other network type including hybrids. Through the network 1220, or even directly, the controller 1200 can interface to other devices or computing platforms such as one or more servers 1222 and/or third-party systems 1224. A battery or power source provides power for the controller 1200.

Figure 13:
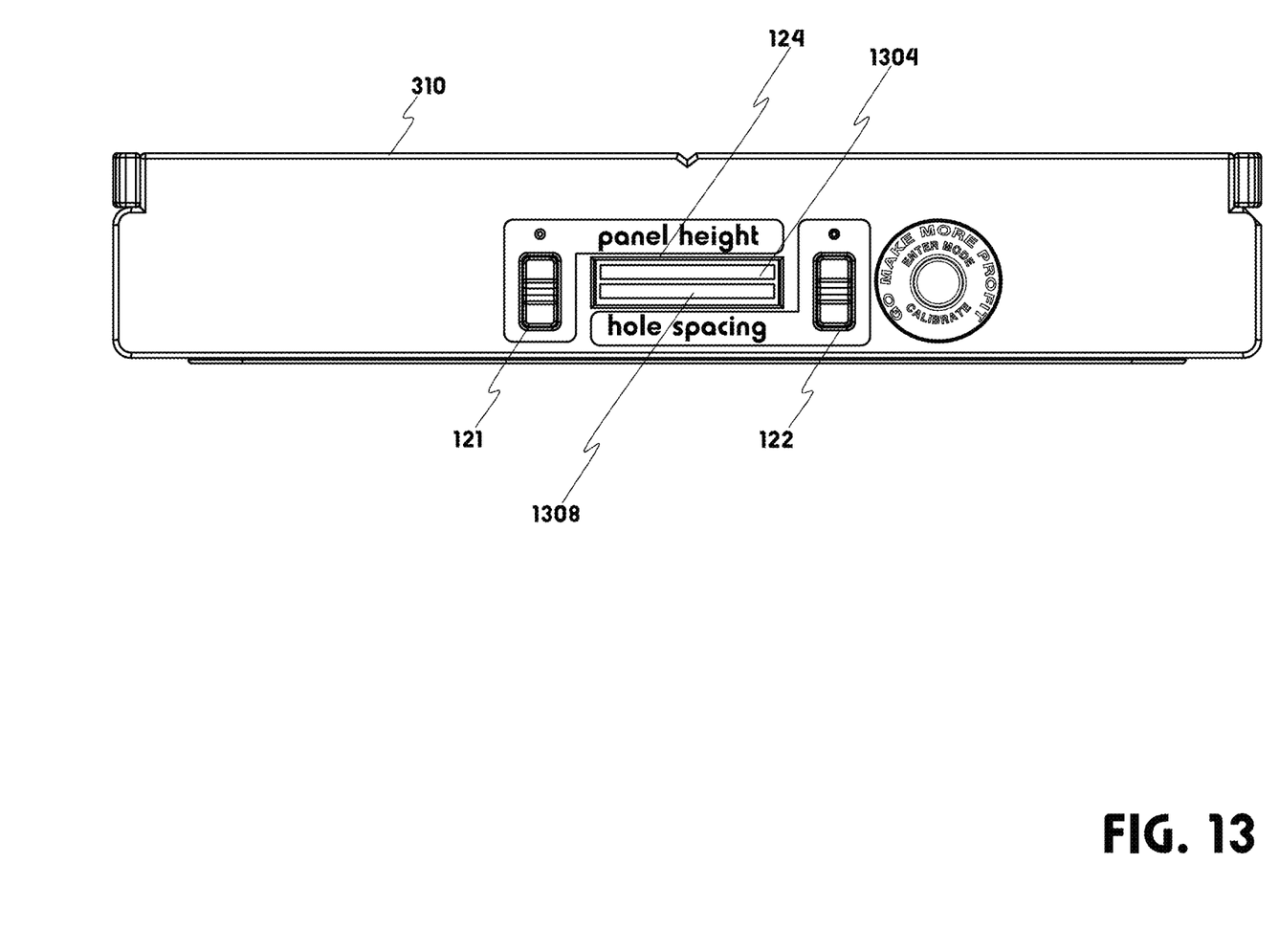
FIG. 13 is a conceptual diagram of an exemplary user interface suitable for various embodiment of the adjustable hardware jig.

FIG. 13 is a conceptual diagram of an exemplary user interface suitable for various embodiment of the adjustable hardware jig. In the illustrated embodiment, the user is provided with a first interface input, such as toggle switch 121, that is used to adjust the measurement of the face panel height. Pressing the toggle switch 121 in one direction will increment the height measurement of the face panel by a particular gradient, such as 1/16 of an inch as a non-limiting example. Pressing the toggle switch 121 in the other direction will decrease the height measurement of the panel by the particular gradient. As such, a user simply measures the height of the panel face and then dials this number into the user interface to be displayed in area 1304 of the display panel 124. Similarly, a user measures the distance between the screw receptors of the hardware pull, center-to-center, and then dials this number into the user interface using a second interface input, such as toggle switch 122, with the set value appearing in area 1308 of the display panel 124. The adjustable hardware jig 100 may adjust the horizontal assembly 340 up or down depending on the number entered for the panel height. This adjustment may be immediate as the user enters numbers or, after the user has entered the desired number, the user can actuate another button to invoke the movement or such movement can be invoked after a delay of time. Likewise, the adjustable hardware jig 100 may adjust the drill guides 346 and 347 (see FIG. 4) as the user actuates the toggle switch 122 or after the user has completely dialed in the desired number and actuated an enter function or after a delay of time.

It will be appreciated that the illustrated figures and examples are provided for an overall understanding of the various aspects and features of the embodiments of the adjustable hardware jig but, that the present invention is not limited by the examples provided. For instance, in some embodiments, the user interface may be utilized to guide the drill guides into a position for a left handle and then a right handle. In such embodiments, the user interface may receive the width of the panel face, height of the panel face and center-to-center spacing of the hardware. The adjustable hardware jig may then calculate the positions for the left handle and the right handle. The adjustable hardware jig may then move the drill guides into position for the left handle. After the user drills holes for the left handle, the user may actuate a button to cause the adjustable hardware jig to move the drill guides to the position for the right handle.

In addition, in some embodiments, the adjustable hardware jig may receive an offset value and then rather than moving the drill guides to the center of the panel face, the adjustable hardware jig may move the drill guides in accordance with the offset. In such an embodiment, the horizontal subassembly may be modified to utilize two step motors, one to control each of the drill guides such that the drill guides can be moved in the same direction as each other or in opposite directions from each other.

Figure 14:
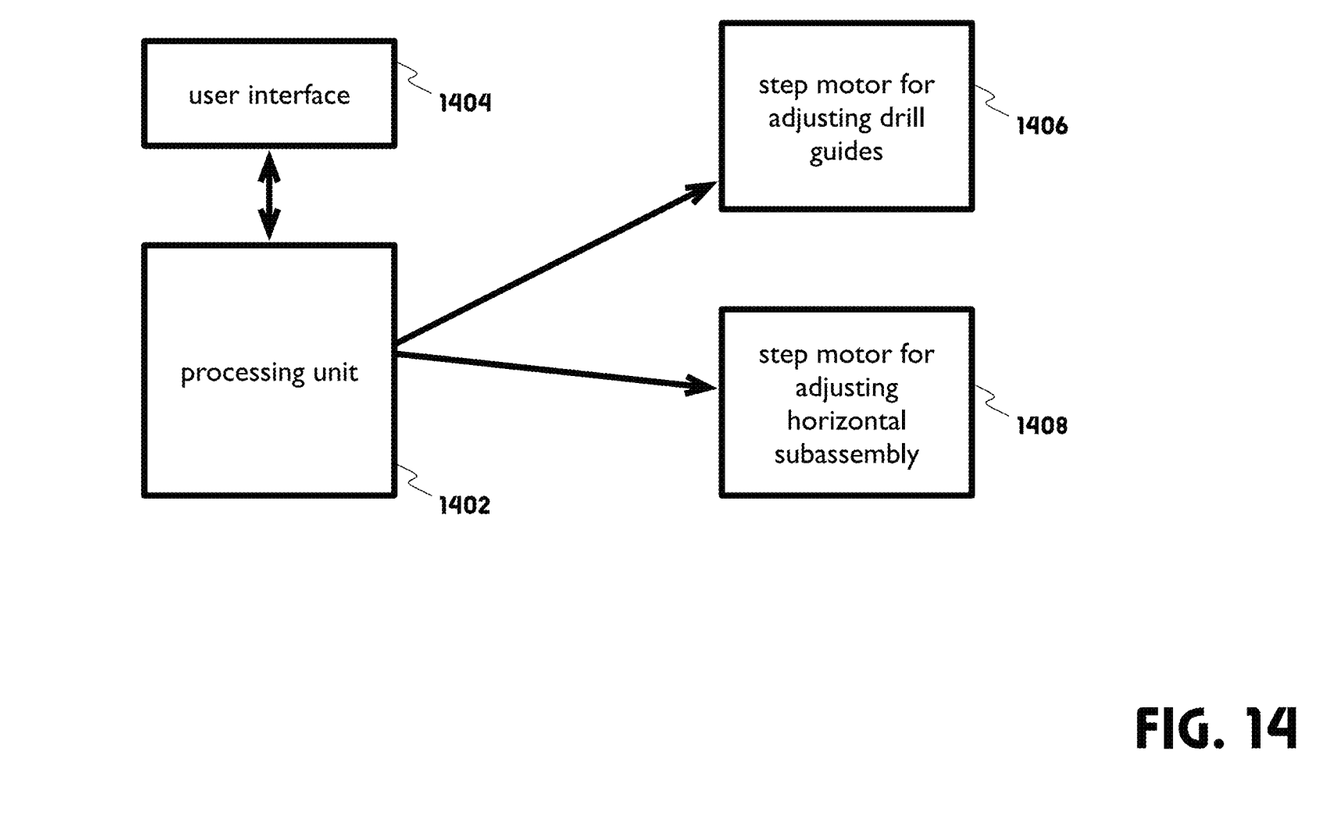
FIG. 14 is a conceptual block diagram illustrating an exemplary control system for an adjustable hardware jig based on system components as presented in FIG. 12.

FIG. 14 is a conceptual block diagram illustrating an exemplary control system for an adjustable hardware jig based on system components as presented in FIG. 12. In the illustrated embodiment, a processing unit 1402 interfaces with the user interface 1404 to receive measurement parameters and instructions. While the illustrated examples have been directed towards a traditional user interface with buttons and displays, it will be appreciated that any of a variety of interfaces may be used such as a wireless interface that is controlled by a remote control, an interface to a computer for entering programming information for the adjustable hardware jig, a smart phone interface using wifi, cellular, bluetooth etc. to receive programming and control commands, or the like. The processing unit 1402, in response to measure parameters and instructions causes the step motor 1406 to adjust the drill guides and the step motor 1408 to adjust the horizontal subassembly. In some embodiments, the processing unit may be able to detect and measure the width of the face panel by reading the setting of the extension arms. In yet other embodiments, one or more vertical extension arms may be used on the side of the adjustable hardware jig to measure the height of the face panel. Likewise, in such embodiments the adjustable hardware jig may also be able to read the height of the face panel by reading the settings for the vertical extension arms. In such embodiments, the requirement for entering the width and height of the face panel can be eliminated. In other embodiments, the drill guides 346 and 347 may include outward facing pins or protrusions that have a diameter small enough to fit within the threaded holes of the hardware. In such embodiments, the user can adjust the drill guides 346 and 347 using the interface 120 until the pins line up with the screw receptors of the hardware. Thus, this would eliminate the need to accurately measuring the center-to-center distance of the hardware.

In some embodiments, the drill guides may actually be drills that once positioned can automatically drill the holes for receiving the hardware. In some embodiments, rather than two rods being used to raise and lower the horizontal subassembly, a single rod or more than two rods may be utilized. In yet other embodiments, rather than using two adjustable drill guides, four adjustable drill guides may be used with the horizontal subassembly then having at least two step motors, one for each set of drill guides or, the horizontal subassembly may use 4 step motors, one for each drill guide.

It will also be appreciated that in come embodiments, a plurality of drill guides may be fixed at particular locations along the horizontal subassembly rather than being adjustable. For instance, drill guides may be positioned at standard center-to-center locations for most available hardware. In such embodiments, the drill guides are simply adjusted vertically with the horizontal subassembly and then the user must select the drill guides to use. In some embodiments of the fixed location drill guides, each of the drill guides may include an LED or other mechanism that is lighted or actuated to let the user know which drill guides are active and to be used to drill the particular holes.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

Each of the elements, functions or functional aspects of the various embodiments of the adjustable hardware jig may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. An apparatus for automating the placement of one or more drill guides for cabinet drawer face panel hardware, the apparatus comprising: a top assembly comprising a shelf for resting the apparatus on a particular edge of a face panel to be drilled; a plurality of extension arms for centering the apparatus on a front of the face panel; a horizontal subassembly that is configured to be adjusted vertically up and down and including one or more drill guides; a processing unit configured to receive measurement parameters from an interface and to control the adjustment of the horizontal subassembly in accordance with the measurement parameters, whereby the horizontal subassembly can be adjusted to align the drill guides at a desired location along the height of the face panel; and a drive gear that is configured to rotate either clockwise or counterclockwise; a threaded rod for each adjustable drill guide, each threaded rod including a rod gear that is driven by the drive gear, whereby when the drive gear rotates, the threaded rod rotates; wherein the drill guides are threaded onto the respective threaded rod, whereby when the threaded rod rotates, the drill guides move a first direction horizontally when the threaded rods rotate clockwise and in a second direction horizontally when the threaded rods rotate counterclockwise.

2. The apparatus of claim 1, wherein the horizontal subassembly includes two adjustable drill guides that can be adjusted horizontally along the horizontal subassembly.

3. The apparatus of claim 2, wherein the horizontal subassembly comprises: a first motor wherein the first motor rotates the drive gear either clockwise or counterclockwise.

4. The apparatus of claim 3, further comprising a subassembly that operates to perform the adjustment of the horizontal subassembly comprising:
a second motor;
a mechanical drive system that is driven by the second motor, the mechanical drive system including one or more threaded vertical rods that are rotated under the control of the second motor and that are threaded into a threaded receiver of the horizontal subassembly, whereby when the one or more threaded vertical rods rotate in a first direction, the horizontal subassembly is lowered, and when the one or more threaded vertical rods rotate in a second direction, the horizontal subassembly is raised.

5. The apparatus of claim 1, wherein the plurality of extension arms further comprise:
a first extension arm that includes a first end cap and a plurality of teeth along a first surface of the first extension arm;
a second extension arm that includes a second end cap and a plurality of teeth along a first surface of the second extension arm;
wherein the top assembly defines a channel for housing the first extension arm and the second extension arm such that the first surface of the first extension arm is held and facing the first surface of the second extension arm with a spacer between the first extension arm and the second extension arm;
one or more synchronizing gears engaged with the teeth on the first surface of the first extension arm and the first surface of the second extension arm, whereby if the first extension arm or the second extension arm is extended, the synchronizing gears cause the other extension arm to extend the same amount.

6. The apparatus of claim 5, wherein the first end cap and the second end cap can be placed on opposing sides of the face panel to hold the apparatus in position.

7. The apparatus of claim 5, wherein the synchronization of the first extension arm and the second extension arm causes the apparatus to be centered on the face panel relevant to the direction of the extension arms.

* * * * *